Patented Nov. 7, 1950

2,528,542

UNITED STATES PATENT OFFICE 2,528,542

HALOGENHYDROXYARYLALIPHATIC ACIDS

Domenick Papa, Brooklyn, N. Y., and Erwin Schwenk, Montclair, N. J., assignors to Schering Corporation, Bloomfield, N. J., a corporation of New Jersey No Drawing. Application May 28, 1948, Serial No. 29,928

14 Claims. (Cl. 260—521)

1

The present invention relates to halogenated derivatives of hydroxyaryl aliphatic acids and more particularly to halogen substitution products of hydroxyaryl alkenoic acids.

It is an object of the present invention to provide a group of compounds having valuable chemotherapeutic properties. A further object of this invention is to provide a series of halogenated hydroxyaryl aliphatic acids which are particularly useful as bactericidal agents effective against gram-negative organisms usually associated with intestinal infections. Another object of this invention is to provide halogenhydroxyaryl alkenoic acids which are characterized by their extremely low toxicity.

In clinical use, the compounds of the invention have been extremely effective against intestinal infections, even when used on children five years of age. Another useful property of the iodinated compounds of this invention is the excellent gall bladder X-ray picture which may be obtained with these substances.

In addition to the bactericidal properties which these compounds possess, pronounced fungistatic activity has been demonstrated with the members of this group of compounds. For such purposes, it is preferable to use the compounds in the form of their zinc salts either in dusting powders or in creams of the vanishing type.

The compounds of the present invention may be represented by the general formula:

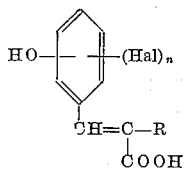

wherein Hal represents halogen; $n$ is one of the integers 1 and 2; and R is an alkyl radical containing from 1 to 8 carbon atoms, and their salts such as the alkali and alkaline earth metal salts.

Compounds of the invention may be made by methods generally identified as the Perkin or modified Perkin reaction. The unsaturated aliphatic acids may be conveniently prepared by condensing a halogenated hydroxyaryl aldehyde with the alkali metal salt of an aliphatic acid in the presence of the anhydride of the aliphatic acid. The halogen alkenoic acids are usually purified by solution in sodium carbonate followed by recrystallization from benzene, or chloroform and petroleum ether. For example, by condensing one mole of anhydrous sodium caproate with

2 one mole or 3,5-diiodo-4-hydroxybenzaldehyde in the presence of three equivalents of caproic anhydride for 25-40 hours at approximately 140-155° C. there results in good yield the α-n-butyl-3,5-diiodo-4-hydroxycinnamic acid.

An alternate method involving the Perkin type reaction is to condense the halogenated hydroxyarylaldehyde with an aliphatic acid and its corresponding anhydride in the presence of a suitable catalyst such as potassium acetate or triethylamine. A typical condensation under these conditions is the following:

A mixture of one mole of caproic acid, one mole of 3,5-diiodo-4-hydroxybenzaldehyde, one mole of anhydrous triethylamine and three moles of caproic anhydride is heated for approximately 50 hours at 110-115° C. In this preparation, the reaction temperature may be raised to 140-150° C. after 15-20 hours at the lower temperature.

The following examples will illustrate the compounds and methods of this invention:

EXAMPLE I

*α-Methyl-3',5-diiodo-4-hydroxycinnamic acid*

This compound is prepared by heating equimolecular amounts of anhydrous sodium propionate and 3,5-diiodo-4-hydroxybenzaldehyde in the presence of four equivalents of propionic anhydride for 25-35 hours at 115-125° C. The reaction product obtained after decomposing the excess anhydride is filtered off, washed with water and then dissolved in 10% sodium hydroxide. The alkaline solution after treatment with charcoal is filtered and sufficient solid carbon dioxide added to convert the sodium hydroxide to sodium carbonate. At this stage a precipitate is usually obtained which is filtered off. The filtrate is acidified and the precipitate obtained from this acidification is combined with that secured from the carbon dioxide treatment. Both products are combined, dissolved in sufficient sodium hydroxide to give a clear solution, treated with charcoal, filtered, cooled and acidified to Congo red paper. The product obtained is dried and after recrystallization from benzene gives fine white needles melting at approximately 190-192° C. with decomposition.

EXAMPLE II

*α-Ethyl-3,5-diiodo-4-hydroxycinnamic acid*

This iodo acid is obtained in accordance with the procedure of Example I from anhydrous sodium butyrate and butyric anhydride. The compound forms colorless needles from benzene melting at approximately 202–203° C. with decomposition.

An alternate method for making this compound is to condense one mole of 3,5-diiodo-4-hydroxybenzaldehyde and one mole of butyric acid in 400–500 cc. of butyric anhydride with one mole of either anhydrous triethylamine or one mole of freshly fused potassium acetate. The reaction product is worked up as described above to yield the compound of this example. By proceeding in accordance with the instructions of Example I, the compound of this example is obtained in the form of white crystalline needles.

EXAMPLE III

*α-n-Butyl-3,5-diiodo-4-hydroxycinnamic acid*

By reacting the iodinated aldehyde with anhydrous potassium caproate and caproic anhydride as described in Example I and recrystallizing the product from benzene-petroleum ether, the iodinated acid is obtained as a white crystalline product melting at approximately 181–182° C. with decomposition.

EXAMPLE IV

*α-n-Amyl-3,5-diiodo-4-hydroxycinnamic acid*

A mixture of 187 g. (0.5 mole) 3,5-diiodo-4-hydroxybenzaldehyde, 76 g. (0.5 mole) anhydrous sodium heptylate and 400 g. of heptylic anhydride are heated with stirring at 120–140° C. for 35–45 hours. The reaction product so obtained is purified by recrystallization from benzene-alcohol mixture. The compound is a white crystalline product melting at approximately 208–209° C. with decomposition.

EXAMPLE V

*α-n-Octyl-3,5-diiodo-4-hydroxycinnamic acid*

By reacting 3,5-diiodo-4-hydroxybenzaldehyde, anhydrous sodium caprate and capric anhydride, as described in Example I, there is obtained the compound of this example melting at approximately 200° C. with decomposition after recrystallization from a mixture of benzene and alcohol.

Analogous compounds of similar utility are obtained when 3,5-diiodo-2-hydroxybenzaldehyde is substituted for the 4-hydroxy isomer in the foregoing examples.

EXAMPLE VI

*α-Ethyl-3,5-dichloro-4-hydroxycinnamic acid*

By substituting 3,5-dichloro-4-hydroxybenzaldehyde for the chlorohydroxybenzaldehyde of Example II, the substance of this example is obtained as a white, crystalline solid melting at 221–222° C.

EXAMPLE VII

*α-Ethyl-3,5-dibromo-4-hydroxycinnamic acid*

This compound is made in accordance with the procedure of the preceding example by substituting the dibromohydroxy aldehyde for the dichloro compound. The substance is a white solid recrystallizable from aqueous ethanol and melts at 195–198° C.

EXAMPLE VIII

*α-n-Butyl-3,5-dichloro-4-hydroxycinnamic acid*

By substituting 3,5-dichloro-4-hydroxybenzaldehyde for the 3,5-diiodo-4-hydroxybenzaldehyde of Example III, the dichloro acid is obtained as a white, crystalline solid from benzene-petroleum ether.

EXAMPLE IX

*α-n-Butyl-3,5-dibromo-4-hydroxycinnamic acid*

By substituting 3,5-dibromo-4-hydroxybenzaldehyde for the 3,5-diiodo-4-hydroxybenzaldehyde of Example III, the dibromo acid is obtained as a white, crystalline solid from benzene-petroleum ether with a melting point of 184–185° C.

EXAMPLE X

*α-Methyl-3-chloro-4-hydroxycinnamic acid*

A mixture of one mole of 3-chloro-4-hydroxybenzaldehyde, one mole of anhydrous sodium proprionate and three moles of propionic anhydride are heated with stirring at 130–135° C. for approximately thirty hours. The reaction mixture is then worked up as described in Example I to yield the compound of this example melting at 152–152.5° C. after recrystallization from aqueous ethanol.

EXAMPLE XI

*α-Ethyl-3-chloro-4-hydroxycinnamic acid*

This acid is prepared from anhydrous sodium butyrate, 3-chloro-4-hydroxybenzaldehyde and butyric anhydride as described for the homologous compound of Example X. Slightly better yields may be secured by increasing the reaction temperature to 140° C. and lengthening the reaction time to approximately forty hours. The substituted butyric acid melts after recrystallization from aqueous ethanol at 160–160.5° C.

EXAMPLE XII

*α-Methyl-3,5-dichloro-4-hydroxycinnamic acid*

This dichloro acid is obtained in accordance with the procedure of Example X by substituting 3,5-dichloro-4-hydroxybenzaldehyde for the monochlorohydroxybenzaldehyde. It is a white, crystalline solid melting at 229–230° C. after recrystallization from aqueous ethanol.

EXAMPLE XIII

*α-Methyl-3,5-dibromo-4-hydroxycinnamic acid*

The condensation of 3,5-dibromo-4-hydroxybenzaldehyde with anhydrous sodium propionate in propionic anhydride in accordance with Example X gives the dibromo cinnamic acid melting at 220–222° C.

EXAMPLE XIV

*α-n-Butyl-3-chloro-4-hydroxycinnamic acid*

This acid is prepared from anhydrous sodium caproate, 3-chloro-4-hydroxybenzaldehyde and caproic anhydride as described for the homologous compound of Example X. The substituted caproic acid melts, after recrystallization from aqueous ethanol, at about 169–171° C.

EXAMPLE XV

*α-Methyl-3-bromo-4-hydroxycinnamic acid*

This compound is obtained from 3-bromo-4-hydroxybenzaldehyde as described for the corresponding chloro compound of Example X.

EXAMPLE XVI

*α-Ethyl-3-bromo-4-hydroxycinnamic acid*

This compound is obtained from 3-bromo-4-hydroxybenzaldehyde as described for the corresponding chloro compound of Example XI.

EXAMPLE XVII

*α-n-Butyl-3-bromo-4-hydroxycinnamic acid*

This compound is obtained from 3-bromo-4-hydroxybenzaldehyde as described for the corresponding chloro compound of Example XIV.

EXAMPLE XVIII

*α-n-Hexyl-3,5-diiodo-4-hydroxycinnamic acid*

A mixture of 16.6 g. (0.1 mole) of anhydrous sodium caprylate, 37.4 g. (0.1 mole) 3,5-diiodo-4-hydroxybenzaldehyde and 81 g. of caprylic anhydride is heated for approximately 30 hours at 130° C. After decomposing the excess anhydride, the reaction mixture is worked up as described in the previous examples and melts at 190–194° C. Recrystallized from a mixture of ethanol-water, M. P. 195–196° C.

The terms "halogen" and "halogenated" as used in the specification and claims are intended to denote chlorine, bromine and iodine.

This application is a continuation-in-part of our application Serial No. 754,600 filed June 13, 1947, now abandoned.

We claim:

1. Compounds of the group consisting of acids of the general formula

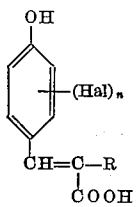

wherein Hal represents a halogen atom of atomic number not less than 17 and not more than 53, $n$ is an integer not less than 1 and not more than 2, and R is an alkyl radical containing from 1 to 8 carbon atoms, and the alkali and alkaline earth metal salts thereof.

2. Compounds of the general formula

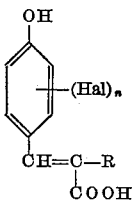

wherein Hal represents a halogen atom of atomic number not less than 17 and not more than 53, $n$ is an integer not less than 1 and not more than 2, and R is an alkyl radical containing from 1 to 8 carbon atoms.

3. Compounds as defined in claim 2 wherein Hal is bromine.

4. Compounds as defined in claim 2 wherein Hal is chlorine.

5. Compounds as defined in claim 2 wherein $n$ is two and the halogens are in the 3,5 position.

6. Compounds as defined in claim 2 wherein R is methyl.

7. Compounds as defined in claim 2 wherein R is butyl.

8. Compounds as defined in claim 2 wherein R is ethyl.

9. Compounds as defined in claim 2 wherein Hal is iodine.

10. Compounds of the group consisting of α-methyl-3,5-diiodo-4-hydroxycinnamic acid and the alkali and alkaline earth metal salts thereof.

11. Compounds of the group consisting of α-ethyl-3,5-diiodo-4-hydroxycinnamic acid and the alkali and alkaline earth metal salts thereof.

12. Compounds of the group consisting of α-n-butyl-3,5-diiodo-4-hydroxycinnamic acid and the alkali and alkaline earth metal salts thereof.

13. Compounds of the group consisting of α-n-butyl-3,5-dichloro-4-hydroxycinnamic acid and the alkali and alkaline earth metal salts thereof.

14. Compounds of the group consisting of α-ethyl-3,5-dibromo-4-hydroxycinnamic acid and the alkali and alkaline metal salts thereof.

DOMENICK PAPA.
ERWIN SCHWENK.

REFERENCES CITED

The following references are of record in the file of this patent:

UNITED STATES PATENTS

| Number | Name | Date |
|---|---|---|
| 2,080,863 | Harden | May 18, 1937 |
| 2,400,433 | Natelson et al. | May 14, 1946 |

FOREIGN PATENTS

| Number | Country | Date |
|---|---|---|
| 843,433 | France | July 3, 1939 |

OTHER REFERENCES

Paal et al.: Ber Deut Chem., vol. 29, p. 2306 (1896).

Wheeler et al.: Am. Chem. J., vol. 43, pp. 14–18 (1910).

Sen et al.: Chem. Abstracts, vol. 24, p. 4774 (1930).

Chakrawarti et al.: Chem. Abstracts, vol. 32, col. 7027 (1938).

Pandya et al.: Chem. Abstracts, vol. 38, col. 1737 (1944).